US011821481B2

(12) United States Patent
Pirovano et al.

(10) Patent No.: US 11,821,481 B2
(45) Date of Patent: Nov. 21, 2023

(54) CABLE-PULL ACTUATION SYSTEM FOR A PARKING BRAKE, PARKING BRAKE AND METHOD FOR UNLOCKING A PARKING BRAKE THEREOF

(71) Applicant: FRENI BREMBO S.P.A., Curno (IT)

(72) Inventors: Italo Pirovano, Curno (IT); Nicolò Mazzarini, Curno (IT); Marco Radaelli, Curno (IT); Tomasz Woloszyn, Curno (IT); Alessandro Galassi, Curno (IT)

(73) Assignee: Brembo S.p.A., Bergamo (IT)

( * ) Notice: Subject to any disclaimer, the term of this patent is extended or adjusted under 35 U.S.C. 154(b) by 471 days.

(21) Appl. No.: 17/052,220

(22) PCT Filed: Apr. 18, 2019

(86) PCT No.: PCT/IB2019/053211
§ 371 (c)(1),
(2) Date: Nov. 2, 2020

(87) PCT Pub. No.: WO2019/211694
PCT Pub. Date: Nov. 7, 2019

(65) Prior Publication Data
US 2022/0010853 A1    Jan. 13, 2022

(30) Foreign Application Priority Data

May 2, 2018   (IT) .................. 102018000005001

(51) Int. Cl.
*F16D 65/14*   (2006.01)
*F16D 65/22*   (2006.01)
(Continued)

(52) U.S. Cl.
CPC ............. *F16D 65/22* (2013.01); *F16D 51/18* (2013.01); *F16D 2121/24* (2013.01);
(Continued)

(58) Field of Classification Search
CPC ...... F16D 65/22; F16D 51/18; F16D 2121/24; F16D 2125/40; F16D 2125/60; B60T 11/046; B60T 13/746
See application file for complete search history.

(56) References Cited

U.S. PATENT DOCUMENTS 5,180,038 A    1/1993   Arnold et al.
6,966,410 B1*  11/2005  Tacker ................ F16H 63/3466
                                              188/72.1
(Continued)

FOREIGN PATENT DOCUMENTS

| CN | 101317024 A | 12/2008 |
| CN | 101517261 A | 8/2009 |
| CN | 106104058 A | 11/2016 |

OTHER PUBLICATIONS

European Patent Office, International Search Report with Written Opinion, issued in PCT/IB2019/053211, dated Jul. 19, 2019, 13 pages, European Patent Office, Rijswijk, Netherlands.
(Continued)

*Primary Examiner* — Nicholas J Lane
(74) *Attorney, Agent, or Firm* — Marshall & Melhorn, LLC

(57) ABSTRACT

A cable-pull actuation system for a parking brake may have a body which houses an electric motor device. A rod, adapted to operate along an actuation direction, at a first end thereof, an actuation member of a drum brake and/or of a parking brake. A transmission device may operatively connect the electric motor device to a second end of the rod which is translationally integral with a screw. The screw may be engaged with a nut screw rotationally actuated by the transmission device. A pre-loading device may act in contrast on the screw. The pre-loading device may be compressively pre-loaded to exert a pre-load traction on the rod to offset variations of load on the rod. The pre-loading device
(Continued)

may be configured to exert a thrust action on the rod following the annulment of axial clearances for an incremental compression of the pre-loading device with respect to the pre-load value.

18 Claims, 10 Drawing Sheets

(51) Int. Cl.
    *F16D 51/18*     (2006.01)
    *F16D 121/24*     (2012.01)
    *F16D 125/40*     (2012.01)
    *F16D 125/60*     (2012.01)
    *F16D 125/70*     (2012.01)

(52) U.S. Cl.
    CPC ...... *F16D 2125/40* (2013.01); *F16D 2125/60* (2013.01); *F16D 2125/70* (2013.01)

(56) References Cited

U.S. PATENT DOCUMENTS

| | | | |
|---|---|---|---|
| 7,648,006 B2 | 1/2010 | Deutloff et al. | |
| 9,592,813 B2 | 3/2017 | Chelaidite | |
| 2004/0163896 A1* | 8/2004 | Wang | B60T 11/046 188/162 |
| 2006/0016642 A1* | 1/2006 | Deutloff | B60T 13/746 188/2 A |
| 2007/0240950 A1* | 10/2007 | Deutloff | B60T 7/107 188/265 |
| 2009/0260929 A1* | 10/2009 | Boyle | F16D 65/22 188/326 |
| 2015/0345581 A1* | 12/2015 | Shin | F16D 65/16 188/106 F |
| 2016/0123420 A1* | 5/2016 | Shin | F16D 51/28 188/162 |
| 2016/0375885 A1 | 12/2016 | Chelaidite | |
| 2017/0108065 A1* | 4/2017 | Kim | B60T 11/046 |
| 2018/0354434 A1* | 12/2018 | Kaneko | B60R 16/005 |

OTHER PUBLICATIONS

Italian Patent and Trademark Office, Italian Search Report, issued in IT 102018000005001, dated Oct. 31, 2018, 13 pages, Italian Patent and Trademark Office, Rome, Italy.

China National Intellectual Property Administration, Search Report in Application No. CN201980029780.3, dated Sep. 15, 2022, 17 pages.

* cited by examiner

CABLE-PULL ACTUATION SYSTEM FOR A PARKING BRAKE, PARKING BRAKE AND METHOD FOR UNLOCKING A PARKING BRAKE THEREOF

FIELD OF APPLICATION

The present invention relates to a cable-pull actuation system for a parking brake, to a related parking brake comprising said actuation system, and to the related method for releasing a parking brake.

BACKGROUND ART

Particularly, parking brakes for vehicles usually are drum-type brakes, commonly referred to as "DIH", i.e. "drum-in-hat" brakes, comprising a bell which is rotationally integral with the hub of the wheel and a pair of shoes adapted to exert a braking action on the bell. The shoes are coated with friction material and are movable, for example by rotation, about a hinging point, from a blocking or parking configuration, in which they abut against said bell, to a release configuration, in which they do not interface with said bell, which therefore is free to rotate. The actuation of the shoes occurs by means of a cable or other rod, for example of the bar or chain type, etc., which once put into traction, moves the shoes, for example by means of a lever.

A traction force of the cable connected to said lever is required to ensure the opening of the shoes on the bell of the disc and the subsequent vehicle parking.

This traction function of the cable may be performed manually and may also be performed by an electrically-controlled actuation system.

The known DIH electric cable-pull systems provide the electric control both of the actuation and of the next step of releasing the parking brake.

The step of releasing the parking brake particularly consists of a critical step given that the actuator is to ensure the shoes move away from the drum, and therefore that the brake is completely disengaged so as to avoid residual torque.

Thus, it is fundamental to arrange a system which allows to understand when the release maneuver is terminated because the electric motor continues to supply current during said maneuver so that the gears actuate the movement of the mechanism, typically a screw-nut screw, which allows the tension of the traction cable of the shoes to be loosened up to the completion of the maneuver.

The known solutions do not always ensure the exact identification of the end of the releasing step and often provide controls based on the use of position sensors which do not always make the release operation safe for the purposes of persistence of possible residual torques, and in any case make it too slow when compared with the manual type actuation and release systems.

SUMMARY

The need is therefore felt to solve the drawbacks and limitations mentioned in reference to the prior art.

Such a need is met by a cable-pull actuation system for a parking brake according to claim 1.

Such a need is particularly met by a cable-pull actuation system for a parking brake comprising a body which houses electric motor means, a rod, adapted to operate along an actuation direction, at a first end thereof, an actuation member of a drum brake and/or a parking brake, transmission means, which operatively connect the electric motor means to a second end of the rod which is translationally integral with a screw having a thread, in which said screw is engaged, by means of the thread, with a nut screw rotationally actuated by said transmission means, in which pre-loading means are provided, acting in contrast on the screw, said pre-loading means being compressively pre-loaded by a pusher so as to exert a pre-load traction on the rod to offset variations of load on the rod, where the pre-loading means are configured to exert a thrust action on the rod following the annulment of axial clearances, in the actuation direction, between the nut screw and said body so as to allow an incremental compression of the pre-loading means with respect to the pre-load value.

According to an embodiment, the cable-pull actuation system comprises a control unit programmed to monitor the current absorption of the electric motor means, in particular during the releasing step, and to suspend the power supply to said electric motor means when the current limit value defined during the design is exceeded.

According to an embodiment, said pre-loading means are contained inside a containment cartridge which coaxially houses the screw and the pusher of the pre-loading means.

According to an embodiment, said pre-loading means comprise a coil spring coaxial with the screw and/or cup springs coaxial with the screw.

According to an embodiment, the screw comprises a prismatic connection with the pusher so that the screw can translate axially along the actuation direction, without being able to rotate.

According to an embodiment, said prismatic connection is of the grooved shaft type parallel to the actuation direction.

According to an embodiment, the pusher is coaxial with the screw and at least partially houses a portion of screw which does not mesh with the nut screw.

According to an embodiment, the screw comprises at least one release end stop, adapted to abut against a shoulder of the pusher.

According to an embodiment, a bearing is placed between the nut screw and the pusher, which bearing allows the reciprocal rotation between the nut screw and the pusher and allows to discharge the axial force transferred from the screw to the nut screw on the pre-loading means.

According to an embodiment, the nut screw is coupled according to a prismatic coupling with a bushing operatively connected to the electric motor means so as to rotate and slide axially relative thereto.

According to an embodiment, clearance recovery means are provided between the bushing and the nut screw.

According to an embodiment, the thread between the screw and the nut screw is of the irreversible type.

According to an embodiment, the transmission means are configured so as to achieve overall a transmission of the motion of the irreversible type.

According to an embodiment, the body of the system defines a main housing volume and is equipped with a lid. Moreover, the body is equipped with at least one hole for blowing compressed air.

According to an embodiment, the system is equipped with a manual release system comprising a release gear mechanically connected to the screw, and in which the lid is equipped with an access hole from outside said release gear.

According to an embodiment, said access hole is closed by a removable partition.

The present invention also relates to a parking brake comprising a cable-pull actuation system as described, and further comprising a drum brake fitted with a swivel bell and at least one shoe provided with a friction coating adapted to exert a braking action on the bell when actuated, in which the shoe is provided with an actuation member and in which the first end of the rod is connected to said actuation member.

The present invention also relates to a release method of a parking brake comprising the steps of:
- providing a cable-pull actuation system as described,
- actuating the electric motor means so as to gradually release the rod,
- monitoring the electrical current absorption of the electric motor means during said releasing step,
- interrupting the releasing step when an increase in current absorption is detected when the pre-loading means oppose the release of the rod following the annulment of the axial clearances in the actuation direction between the nut screw and said body.

DESCRIPTION OF THE DRAWINGS

Further features and advantages of the present invention will become more comprehensible from the following description of preferred and non-limiting embodiments thereof, in which.

The elements or parts of elements common to the embodiments described below will be indicated using the same numerals.

DETAILED DESCRIPTION

Figure 1:
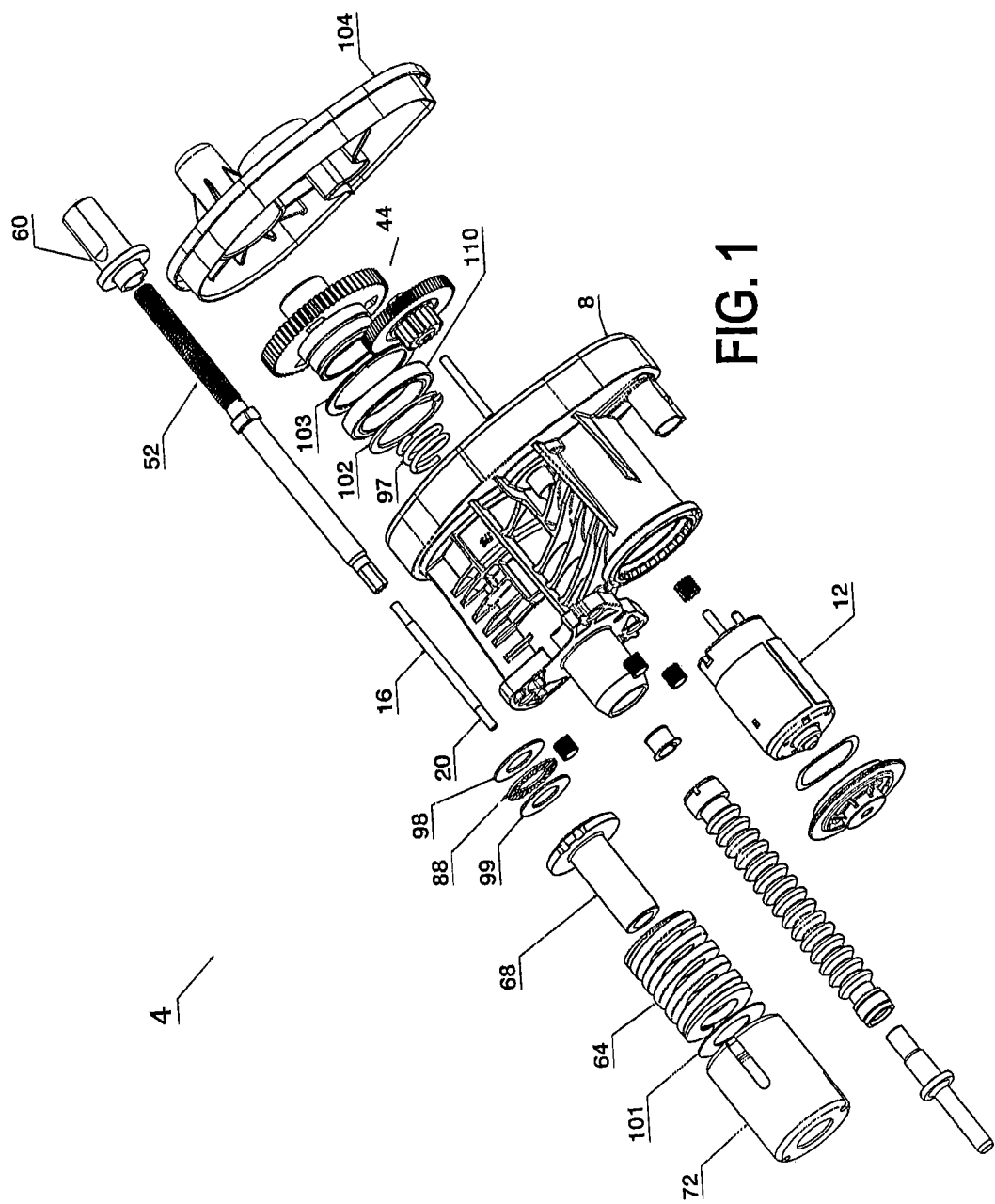
FIG. 1 depicts a perspective view of separate parts of a cable-pull actuation system for a parking brake according to the present invention.
Figure 2:
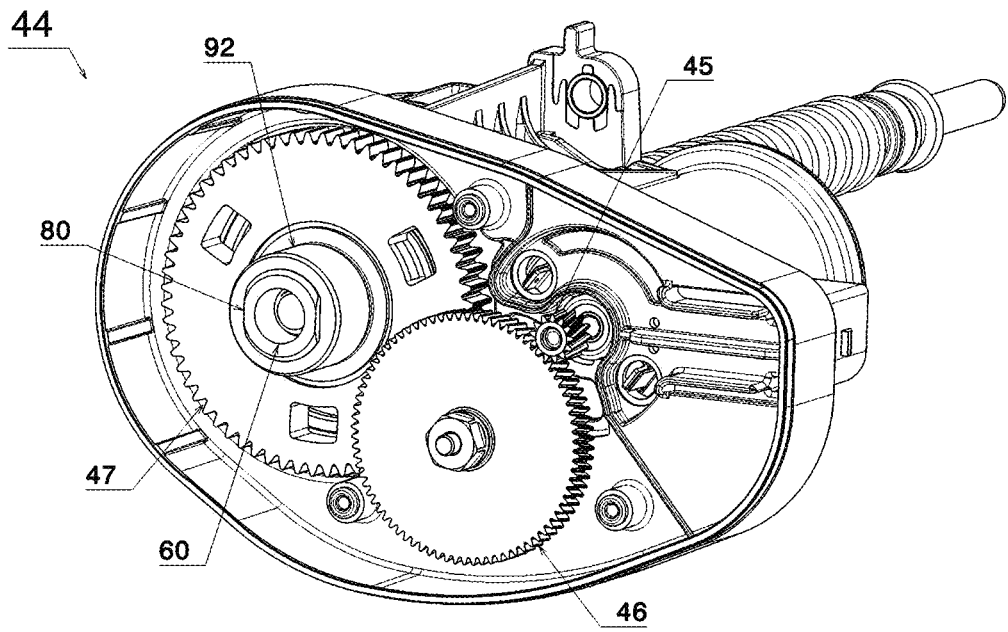
FIG. 2 depicts a perspective view of transmission components of the cable-pull actuation system for a parking brake in FIG. 1.
Figure 3:
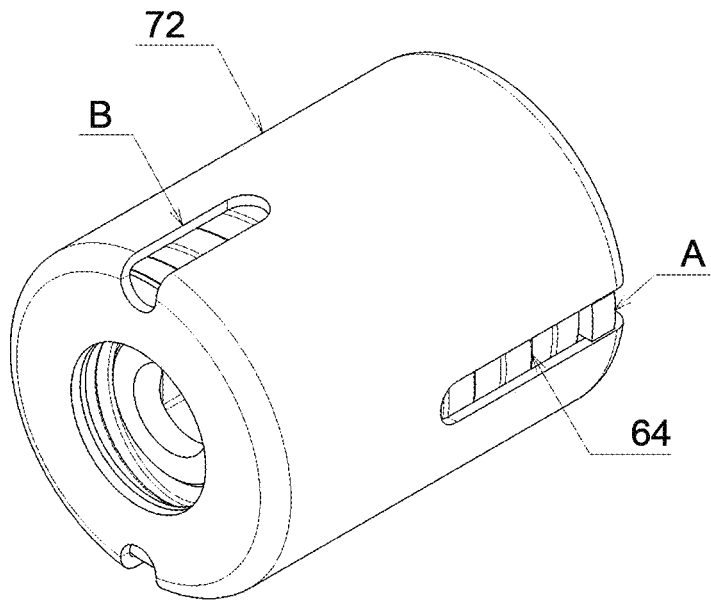
FIG. 3 depicts a perspective view of a cartridge containing a pusher of the actuation system according to the present invention.
Figure 4:
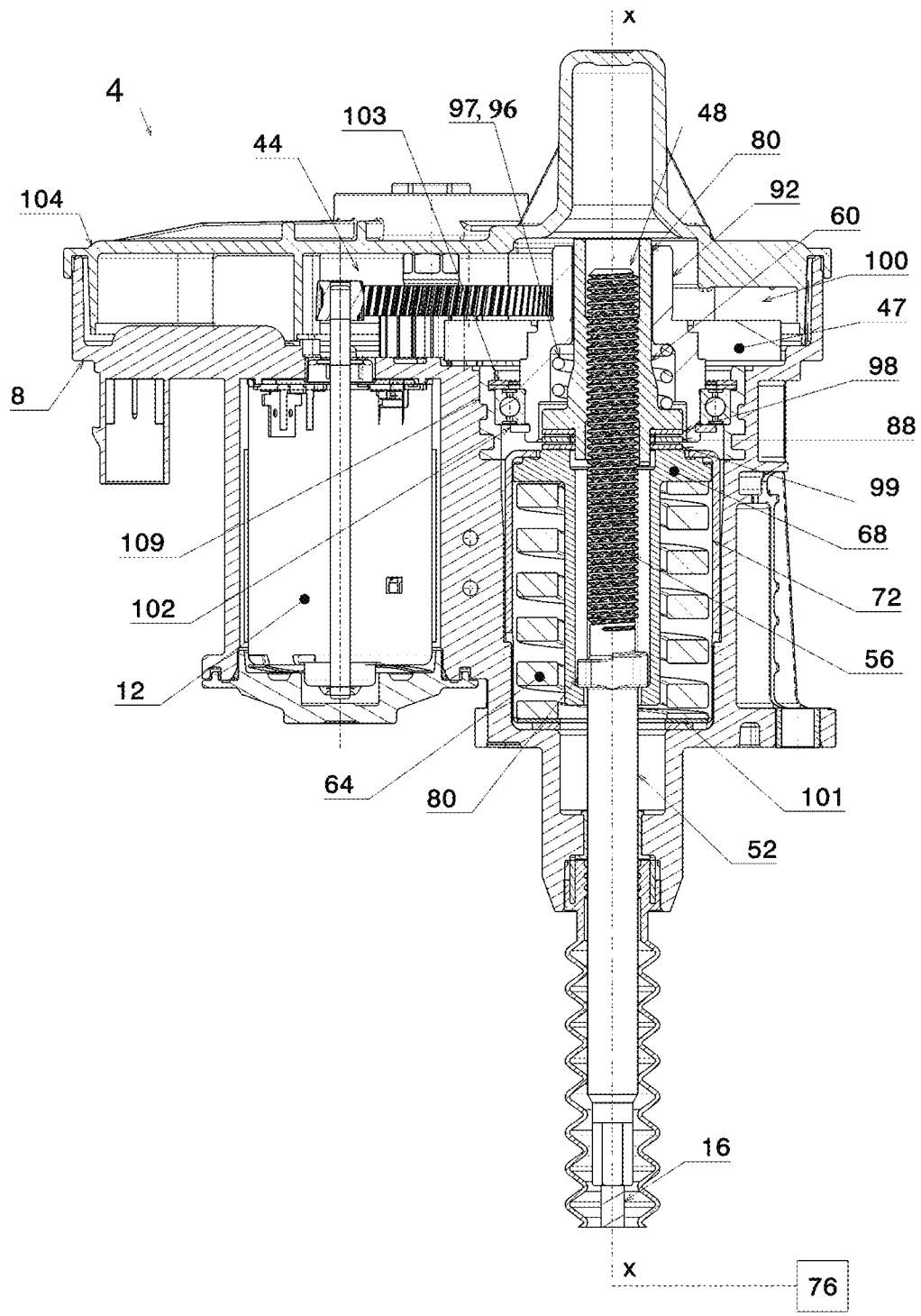
FIGS. 4, 5, 6 depict sectional views, in assembled configuration, of parts of the cable-pull actuation system for a parking brake in FIG. 1, in the new assembly, maximum load application and total release conditions, respectively.
Figure 5:
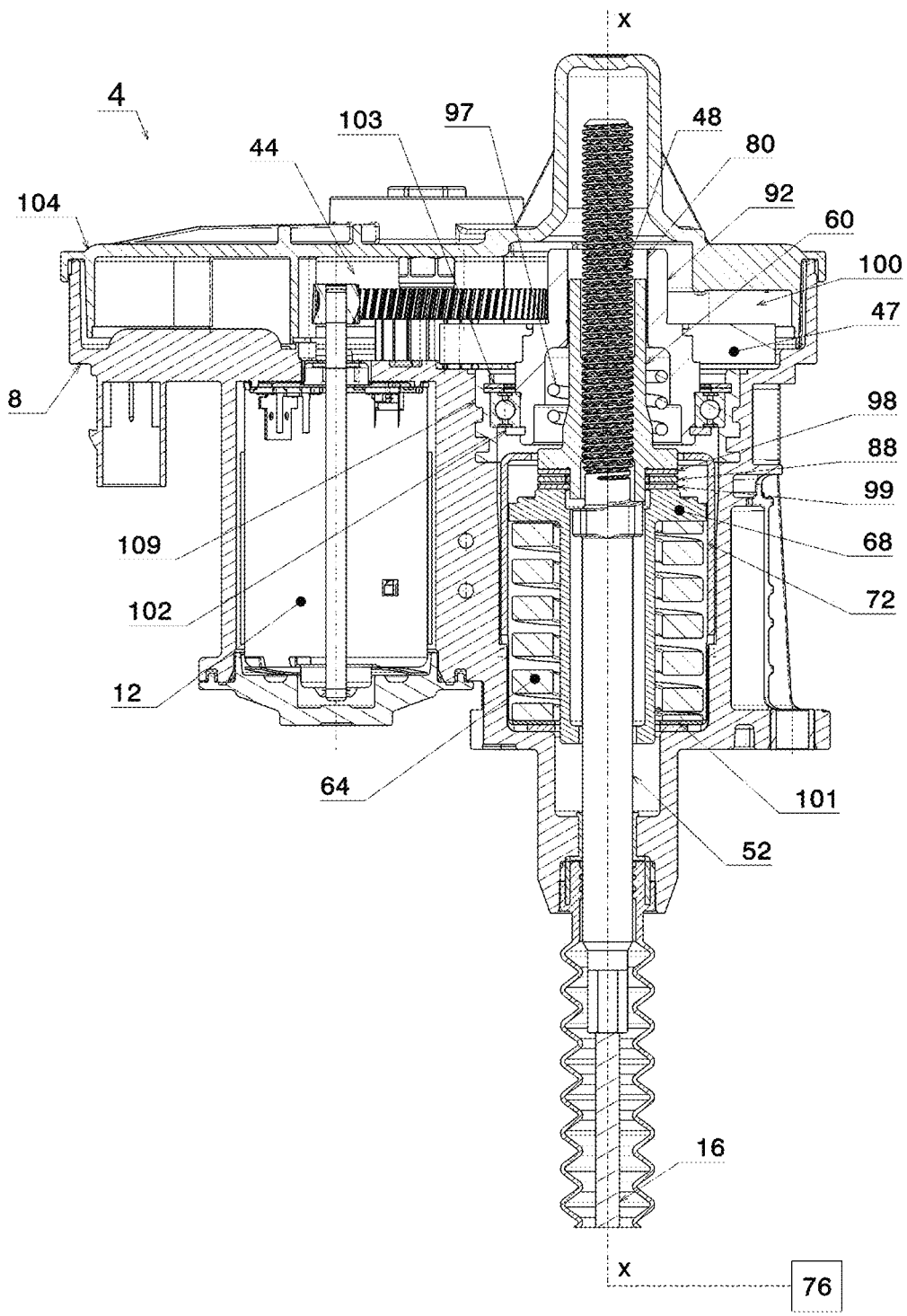

With reference to the aforesaid drawings, a cable-pull actuation system for a parking brake comprising a body 8 which houses electric motor means 12 is indicated as a whole with 4.

For the purposes of the present invention, the dimensions and the material of the body 8 are not identified. Moreover, the electric motor means may be of various type, for example a direct current-powered electric brush motor may be used.

System 4 comprises a rod 16, adapted to operate along an actuation direction X-X, at a first end 20 thereof, an actuation member 24 of a drum brake 28 and/or a parking brake.

It is worth noting that said actuation direction X-X is not necessarily fixed in space, rather it may instead be provided for rod 16 to pivot, and therefore for the actuation direction X-X to vary the orientation thereof in space during the operation of the parking brake.

Rod 16 may comprise both a cable and a rod.

The actuation member 24 of the drum brake 28 comprises for example, a lever 34 adapted to act on at least one shoe 36, usually two shoes 36, equipped with a friction coating 38.

The drum brake 32 is equipped with a rotatable bell 40, at least one shoe 36 equipped with friction coating 38; it is adapted to exert a braking action on bell 40 when actuated.

Shoe 36 may for example, be hinged so as to have a rotary actuation movement, or may also be assembled on a slider so as to translate against bell 40 by means of said actuation member 24.

The first end 20 of rod 16 is connected to said actuation member 24 so as to allow the movement of said shoes 36.

System 4 comprises transmission means 44 which operatively connect the electric motor means 12 to a second end 48 of rod 16.

Said transmission means 44 are preferably configured so as to achieve overall a transmission of the motion of the irreversible type.

The transmission means may comprise for example, a pinion 45 keyed, for example by interference, onto the shaft of the electric motor means 12, and a series of other gears 46 made for example, of plastic material due to noise and comfort needs.

The series of gears achieves the desired reduction ratio. The last step of the reduction is performed by an end gear 47, for example made of plastic material co-molded on a bushing 92, preferably a steel bushing.

The latter end gear 47 is coupled by means of a shape coupling with the nut screw 60, free to axially move with respect to the gear itself.

The second end 48 of rod 16 is axially opposite to the first end 24 along said actuation direction X-X.

The second end 48 is translationally integral with a screw 52 having a thread 56.

Screw 52 in turn is engaged, by means of thread 56, with a nut screw 60 rotationally actuated by said transmission means 44.

Thread 56 between the screw 52 and the nut screw 60 preferably is of the irreversible type.

Pre-loading means 64 acting in contrast on screw 52 are advantageously provided; said pre-loading means 64 are compressively re-loaded by a pusher 68 so as to exert a pre-load traction on rod 16 to offset variations of load on the rod itself.

In particular, the pre-loading means 64 are configured to exert a thrust action on rod 16 following the annulment of axial clearances, in the actuation direction X-X, between the nut screw 60 and body 8, so as to allow an incremental compression of the pre-loading means 64 with respect to the mentioned pre-load value.

In other words, as better described later, the pre-loading means 64 exert an axial action on rod 16 following the annulment of the axial clearances which allows to discharge such an axial action on body 8.

This pre-loading axial thrust tends to move screw 52 close to the nut screw 60, i.e. tends to activate the parking brake or to oppose the related releasing step.

According to a possible embodiment, the pre-loading means 64 are contained inside a containment cartridge 72 which coaxially houses screw 52 and pusher 68 of the pre-loading means 64.

For example, the pre-loading means 64 may comprise a coil spring coaxial with screw 52 and/or cup springs coaxial with screw 52.

Obviously, like pre-loading means 64, further types of springs may be used according to the elastic features and the volumes required.

The presence of the pre-loading means 64, such as for example a coil spring or a cup spring assembly, serves to avoid overloading screw 52 after the possible cooling of bell 40 of the drum brake 28, which causes a traction movement of rod 20 with respect to the mechanism.

Moreover, said pre-loading means 64 serve the function of exerting an axial action on rod 16 following the annulment of the axial clearances which allows to discharge such an axial action on body 8.

Such a function is essential for the purposes of determining the end of the step of releasing the cable-pull actuation system 4.

For this purpose, in particular, system 4 comprises a control unit 76 programmed to monitor the current absorption of the electric motor means 12, particularly during the releasing step, and to suspend the power supply to said electric motor means 12 when a current limit value defined during the design is exceeded.

Figure 12:
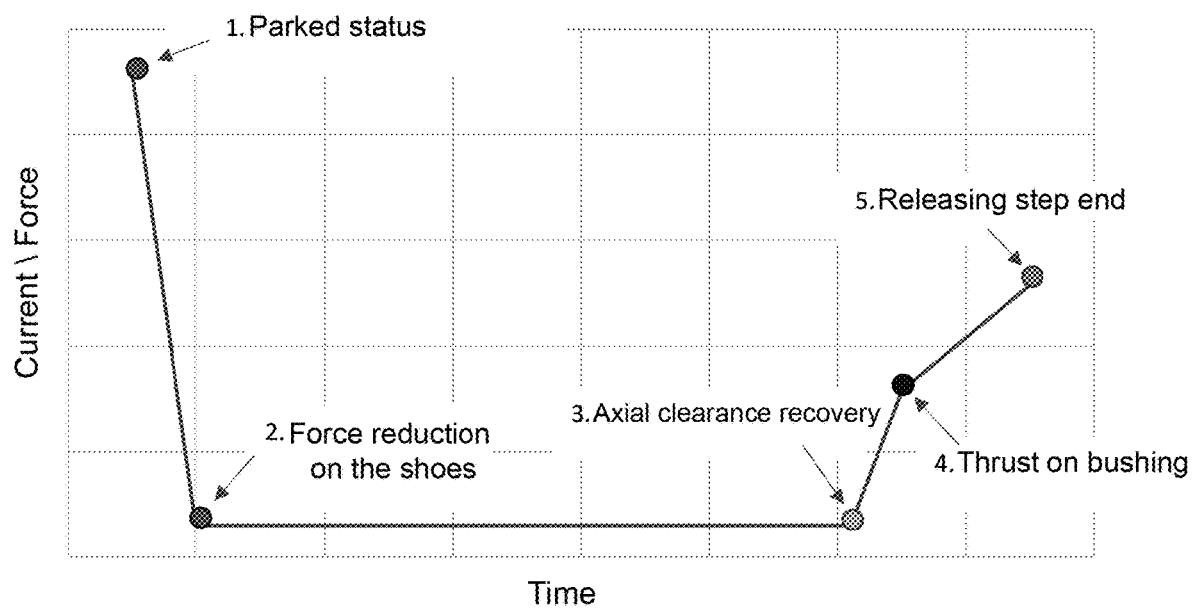
FIG. 12 depicts a graph according to time of the current/force trend of the electric motor means of the actuation system according to the present invention, during a step of releasing the parking brake.

Indeed, the compression of the pre-loading means 64 up to and beyond the pre-load value causes a progressive and significant increase of current absorption (as shown in FIG. 12) which is identified and interpreted by the control unit 76 as reaching the release end stop: such a state allows to deactivate the electric motor means 12 and therefore the end of the step of releasing the parking brake.

As seen, the nut screw 60 is rotationally moved by the electric motor means 12 through the transmission means 44. Screw 52 in turn comprises a prismatic connection 80 with pusher 68 so that screw 52 can translate axially along the actuation direction X-X without being able to rotate.

For example, said prismatic connection 80 is of the grooved shaft type parallel to the actuation direction X-X.

Pusher 68 in turn is coaxial with screw 52 and at least partially houses a portion of screw which does not mesh with the nut screw 60.

Pusher 68 in turn is rotationally blocked with respect to said axis X-X, for example by means of at least one pin A housed in the containment cartridge 72 of the spring or pre-loading means 64. Finally, the containment cartridge 72 is rotationally blocked with respect to body 8 by means of a shape coupling, for example by means of a groove B.

According to an embodiment, screw 52 comprises at least one release end stop 84, adapted to abut against a shoulder 86 of pusher 68.

Figure 6:
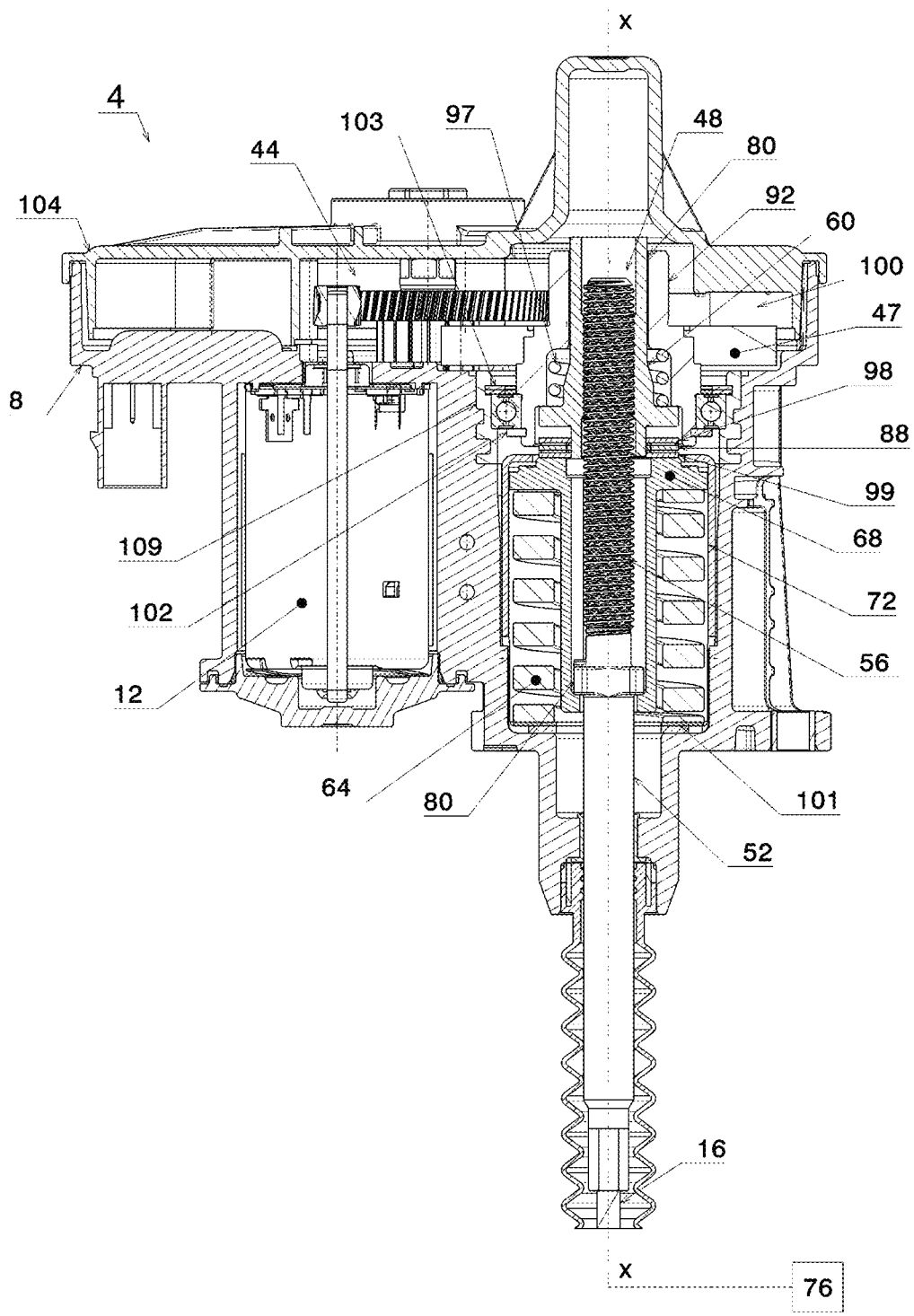
Figure 7:
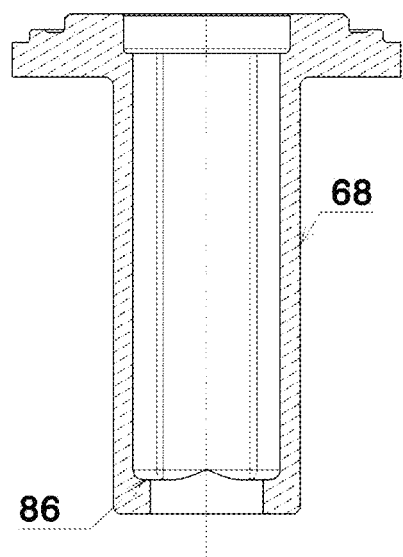
FIG. 7 depicts a sectional view of a pusher of the actuation system according to the present invention.
Figure 8:
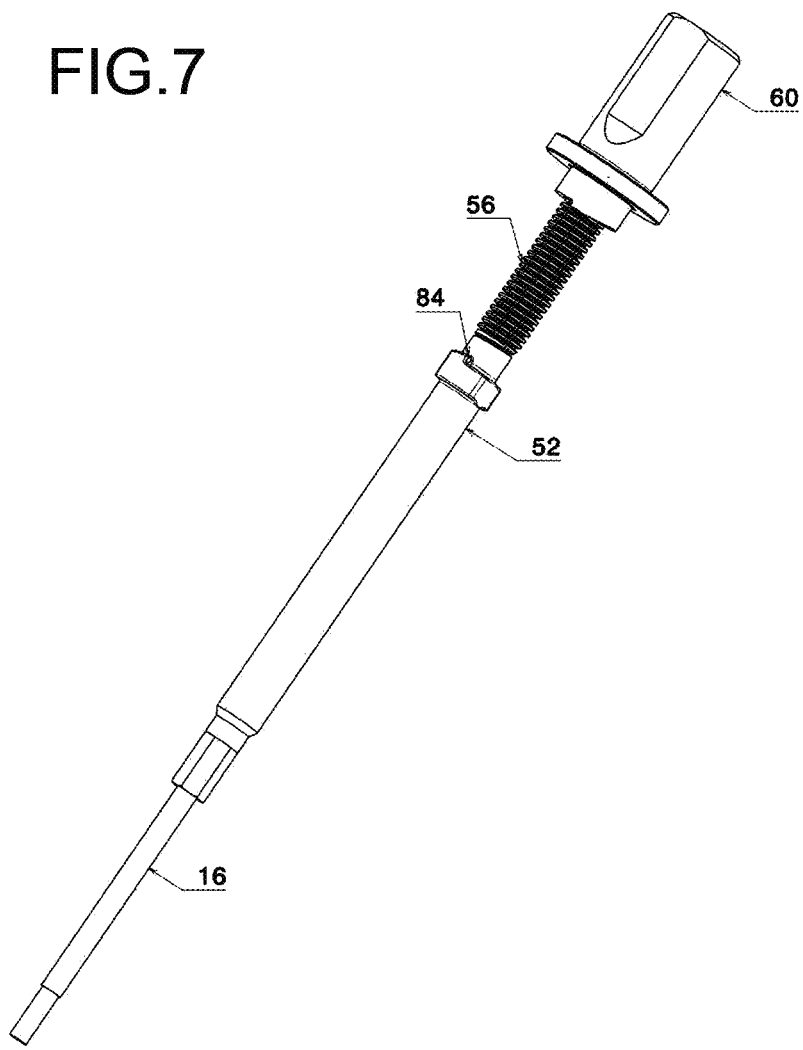
FIG. 8 depicts a perspective view of a screw of the actuation system according to the present invention.
Figure 9:
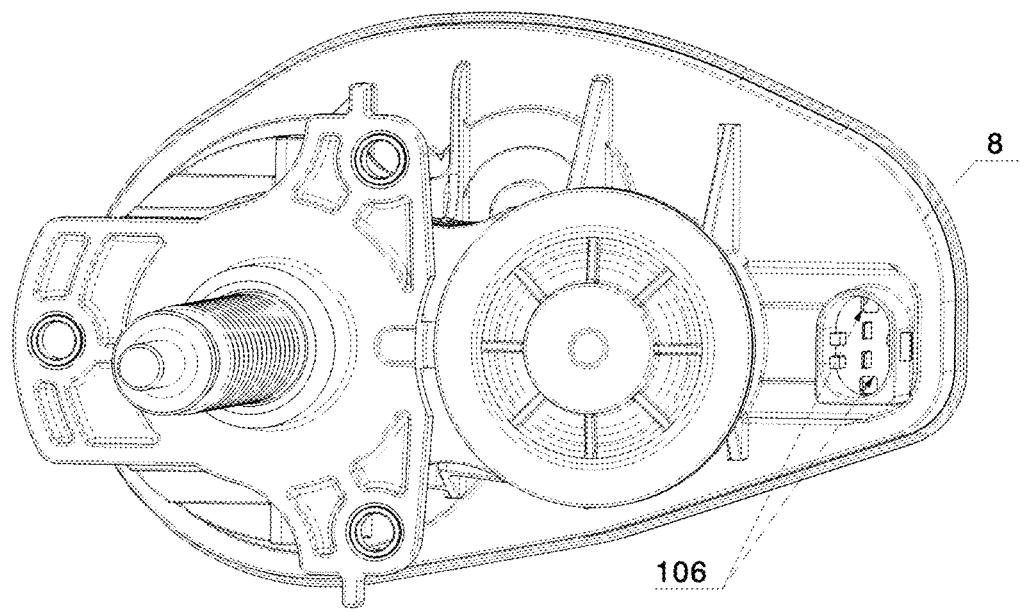
FIGS. 9, 10 depict perspective views from different angles, of a lid and of a body of the actuation system according to the present invention.
Figure 10:
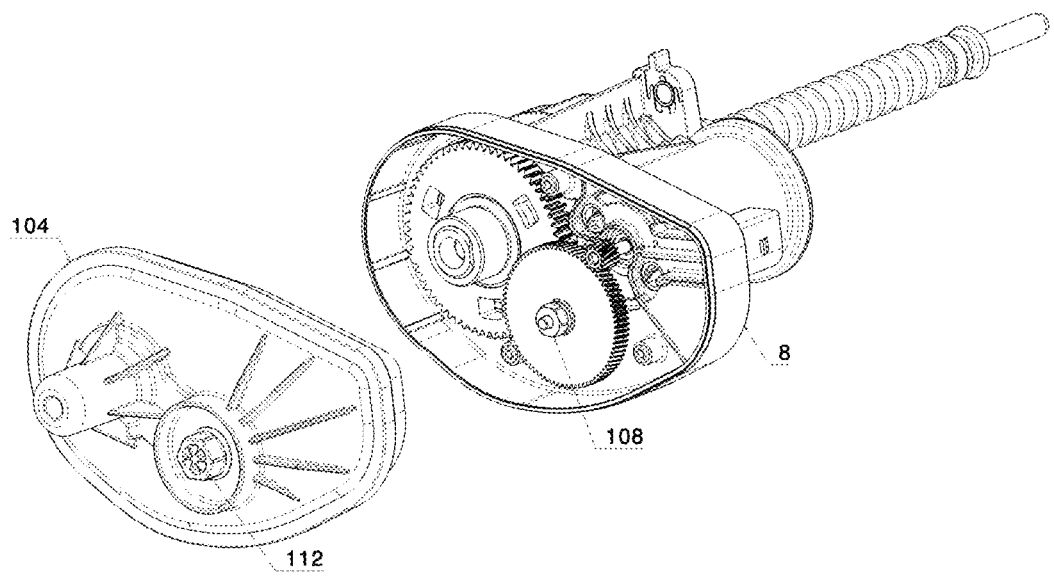
Figure 11A:
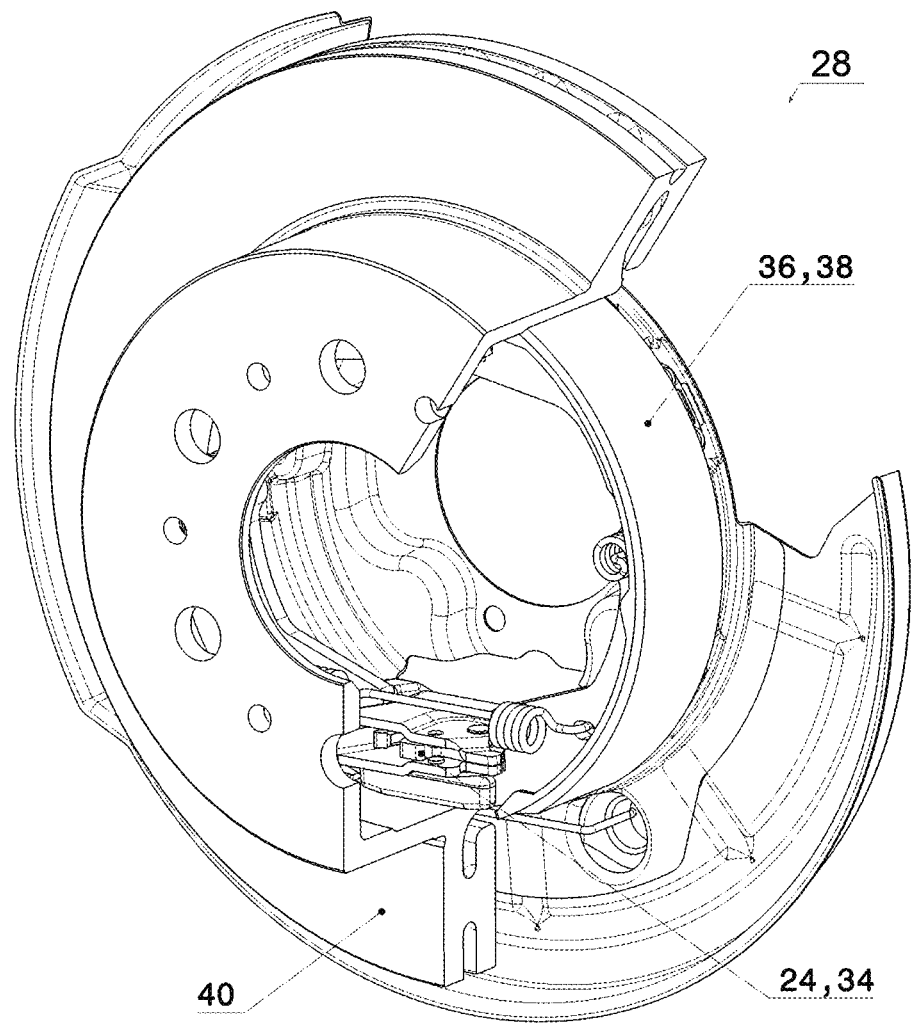
FIGS. 11a, 11b depict perspective sectional views of a drum brake which can be connected to the cable-pull actuation system for a parking brake according to the present invention.
Figure 11B:
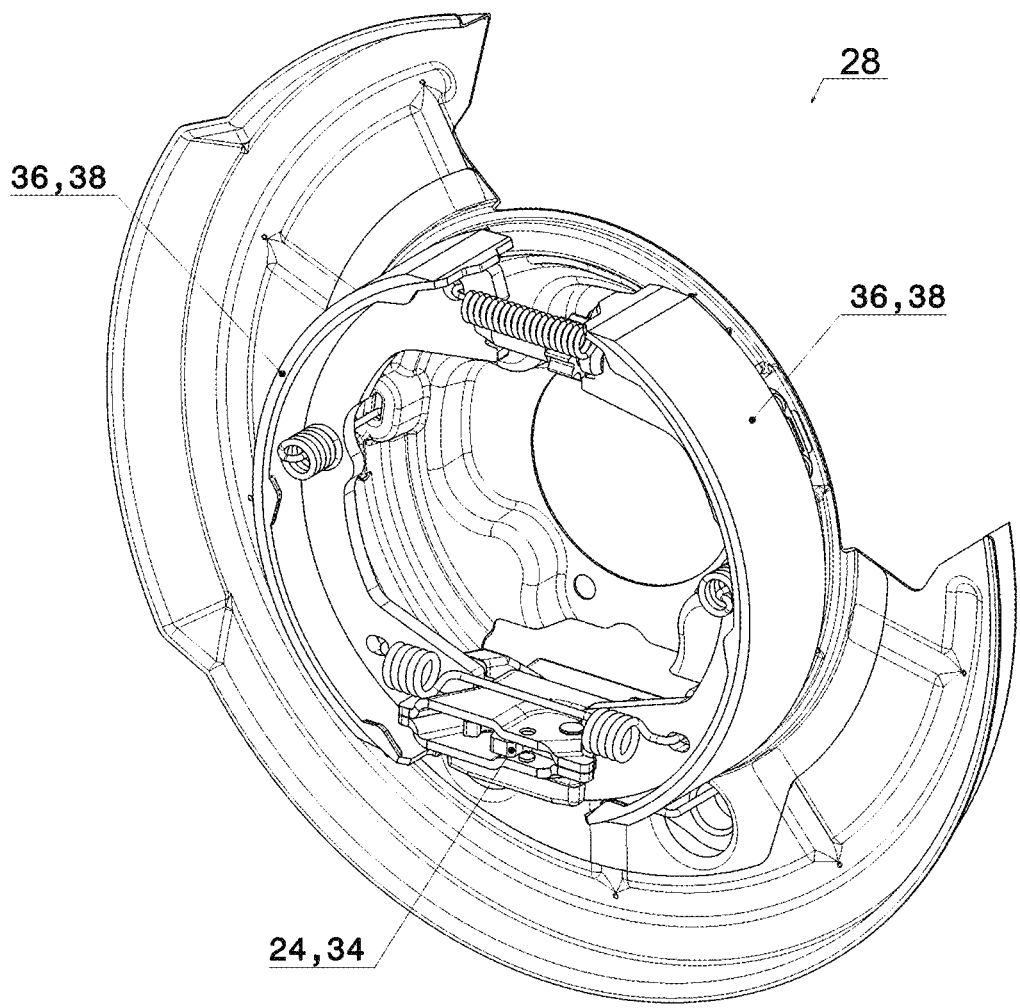

The abutment condition of the end stop 84 against the shoulder, for example, is shown in FIG. 6.

A bearing 88, for example a ball, roller bearing or an axial thrust block, is placed between the nut screw 60 and pusher 68, which bearing allows the reciprocal rotation between the nut screw 60 and pusher 68; moreover, said bearing 88 allows to discharge the axial force transferred from screw 52 to the nut screw 60 on the pre-loading means 64.

According to an embodiment, the nut screw 60 is coupled according to a prismatic coupling 80 with a bushing 92 operatively connected to the electric motor means 12, so as to rotate and slide axially relative thereto.

Thus, bushing 92 allows the final kinematic connection between the electric motor means 12 and the nut screw 60.

According to an embodiment, bushing 92 is kept in place by two Seeger rings 102 and 103, which seats are made in bushing 92 and in a steel insert 109 co-molded in the plastic material body 8, respectively.

According to an embodiment, the rotation of bushing 92 with respect to body 8 is allowed by means of a ball bearing 110.

According to an embodiment, clearance recovery means 96 are provided between bushing 92 and the nut screw 60.

Said clearance recovery means 96 may for example, comprise an elastic element 97 which recovers possible axial clearances between the nut screw 60 and bushing 92 so as to reduce movements caused by external vibrations. Given the maximum and minimum tolerance ranges of the components, the elastic element 97 is for example, sized so as to always ensure a given minimum axial pre-load to ensure the "compaction" of the system.

According to an embodiment, two washers 98 and 99 are arranged between the nut screw 60 and bearing 88 and between bearing 88 and pusher 68, respectively, in order to ensure a resting surface for the proper operation of bearing 88.

According to an embodiment, a further washer 101 is also used between the pre-loading means 64 and the containment cartridge 72 to allow the setting of different initial pre-load levels of the compensating spring.

As mentioned, body 8 of the cable-pull actuation system 4 defines a main housing volume 100 and is equipped with a lid 104. Body 8 is equipped with at least one hole 106 for blowing compressed air.

Blowing compressed air serves to check the effectiveness of the welding between body 8 and lid 104; in other words, the presence is verified of possible leaks which would affect the air-tightness thereof.

The cable-pull system 4 is preferably equipped with a manual release system comprising a release gear 108 mechanically connected to screw 52 so as to allow the release thereof if conveniently gripped and rotated, for example, with a specific wrench, for example an Allen wrench or the like.

Lid 104 is preferably equipped with an access hole 112 from outside said release gear 108.

According to an embodiment, said access hole 112 is closed by a removable partition; to facilitate the removal thereof, the partition may have the shape of a bolt which can be gripped with a wrench and removed (also in destructive manner) to allow the access from the outside to the release gear 108.

The operation of a cable-pull actuation system for a parking brake according to the present invention is now described.

The motion of the screw-nut screw originates from the electric motor means 12 housed in a housing seat or volume 100, for example made of plastic material.

The electric motor means 12 put the nut screw 60 into rotation by means of the transmission means 44, which nut screw is in contact with bearing 88, which in turn rests on pusher 68 and discharges the axial force through the pre-loading means 64 and finally on the outer plastic material shell.

Screw 52, which rotation about axis X-X thereof is blocked by means of a shape coupling of prismatic type with pusher 68, is screwed into the nut screw 60.

Pusher 68 in turn is rotationally blocked for example, by means of said pins A housed in the containment cartridge 72.

Finally, cartridge 72 is rotationally blocked with respect to body 8 by means of a shape coupling, such as at least one groove B.

Screw 52 is thus capable of only moving axially, screwing on the nut screw 60 when the latter is put into rotation by the electric motor means 12 by means of the transmission means 44.

Suitable grooves in axial direction on pusher 68 acting as prismatic connection 80 allow screw 52 to move, thus pulling or releasing rod 16.

The maximum travel range available for the axial movement of screw 52 is set by means of a tooth on the bottom of the nut screw 60 and by the lower surface of pusher 68, which by coming into contact with tooth 84 obtained on screw 52, ensure the blocking of the travel both in fully apply position (cable completely pulled) and in fully release position (cable completely released).

The pre-loading means 64 are pre-loaded due to the effect of the axial sizing of the containment cartridge 72.

Thereby, so long as the load generated by the screw-nut screw mechanism is less than the pre-load, the nut screw 60 remains axially stationary and screw 52 is screwed thereon, thus pulling or releasing rod 16. When the load exceeds the pre-load value, spring 64 starts to compress. Therefore, the nut screw 60 axially slides, following the movement of the spring or pre-loading means 64. The total load generated by the cable-pull system 4 is given by the sum of the contribution due to screw 52 and of the contribution due to the deformation of the spring or pre-loading means 64.

The current/force time trend of the electric motor means 12 during the releasing step is depicted in the graph in FIG. 12.

The graph particularly highlights steps 1 to 5 of the complete releasing procedure of the parking brake.

The parking brake is applied in step 1).

The force on the shoes 36 between step 1) and step 2) is reduced and screw 52 axially moves to loosen the tension on the cable or rod 16: thereby, the force, and therefore the activation current of the electric motor means 12, is progressively decreased.

The shoes are brought to resting position and the axial clearance between the nut screw 60 and bushing 92 is also recovered between step 2 and step 3.

The current/force is substantially constant in this range.

Then a repeated increase of the current and of the force due to the thrust exerted by the nut screw 60 on bushing 92 up to reaching the pre-load value of the pre-loading means 64, occurs between step 3 and step 4. The pre-loading means 64 oppose the step of releasing the parking brake already in this step, thus determining the increase of the force and of the activation current of the electric motor means 12.

Finally, a decided change of slope due to the compression of the pre-loading means 64 occurs between step 4 and step 5: when the spring pre-load is exceeded, the spring or pre-loading means 64 starts compressing, thus significantly increasing the force/current trend.

The action in this step due to the pre-loading means 64 is predominant and decidedly detectable in terms of current absorption.

The control unit 76 is therefore capable of recognizing the characteristic increase of the current during step 3 to 5, thus giving rise to the suspension of the electric power supply and terminating the step of releasing the parking brake.

Obviously, the control unit 76 may be programed in order to properly interpret the detections of current absorption during the releasing step while considering possible tolerances and hardenings of the actuation mechanism and always ensuring the termination of the actuation of the electric motor means 12 when the release of the parking brake is complete and there are no residual torque risks to the wheels.

As may be appreciated by what is described, the cable-pull actuation system for a parking brake according to the invention allows to overcome the drawbacks introduced in the known art.

The cable-pull actuation system for a parking brake particularly solves the problem of the releasing step which occurs in a quick, effective and reliable manner.

Indeed, the present invention also allows to obtain an effective emergency release system in the case of malfunctioning of the electric motor means.

Due to the pre-loading means, the actuation system is also capable of compensating the losses of load when the braking torque is applied and also allows to obtain controlled increases of load in the case of parking with high temperature disc, i.e. drum (i.e. under thermal overload conditions).

Those skilled in the art, aiming at meeting contingent and specific needs, can make several changes and variants to the cable-pull actuation systems for a parking brake described above, all contained within the scope of the invention as defined by the following claims.

The invention claimed is:

1. A cable-pull actuation system for a parking brake, comprising:
   a body which houses an electric motor device,
   a rod, suitable to operate along an actuation direction, at a first end, an actuation member of a drum brake and/or a parking brake,
   a transmission device which operatively connects the electric motor device to a second end of the rod integral in translation with a screw, having a thread,
   wherein said screw is engaged, via a thread, to a nut screw actuated in rotation by said transmission device,
   where a pre-loading device is provided, acting in contrast on the screw, said pre-loading device being pre-loaded in compression by a pusher so as to exert a pre-load traction on the rod to offset variations of load on the rod,
   wherein the pre-loading device is configured to exert a thrust action on the rod following the annulment of axial clearances, in the actuation direction, between the nut screw and said body, so as to allow a compression of the incremental pre-loading device with respect to the pre-load value,
   further comprising a control unit programmed to monitor the current absorption of the electric motor device during the release phase, and to suspend the power supply to said electric motor device when a current limit value defined in the design phase is exceeded.

2. The cable-pull actuation system for a parking brake according to claim 1, wherein said pre-loading device is contained inside a containment cartridge which coaxially houses the screw and pusher of the pre-loading device.

3. The cable-pull actuation system for a parking brake according to claim 1, wherein said pre-loading device comprises a coil spring coaxial with the screw and/or cup springs coaxial with the screw.

4. The cable-pull actuation system for a parking brake according to claim 1, wherein the screw comprises a prismatic connection with the pusher so that the screw can translate axially along the actuation direction, without being able to rotate.

5. The cable-pull actuation system for a parking brake according to claim 1, wherein said prismatic connection is through a grooved shaft parallel to the actuation direction.

6. The cable-pull actuation system for a parking brake according to claim 1, wherein the pusher is coaxial with the screw and houses at least partially a portion of screw that does not mesh with the nut screw.

7. The cable-pull actuation system for a parking brake according to claim 1, wherein the screw comprises at least one release end stop, suitable to abut against a shoulder of the pusher.

8. The cable-pull actuation system for a parking brake according to claim 1, wherein between the nut screw and the pusher a bearing is placed which allows the reciprocal rotation between the nut screw and the pusher and allows the axial force to be discharged, transferred from the screw to the nut screw, on the pre-loading device.

9. The cable-pull actuation system for a parking brake according to claim 1, wherein the nut screw is coupled according to a prismatic coupling with a bushing operatively connected to the electric motor device, so as to rotate and slide axially relative thereto.

10. The cable-pull actuation system for a parking brake according to claim 9, wherein a recovery device is provided in a clearance between the bushing and the nut screw.

11. The cable-pull actuation system for a parking brake according to claim 1, wherein the thread between the screw and the nut screw is irreversible.

12. The cable-pull actuation system for a parking brake according to claim 1, wherein said transmission device is configured in such a way as to achieve overall an irreversible transmission of the motion.

13. The cable-pull actuation system for a parking brake according to claim 1, wherein the body of the system defines a main housing volume and is equipped with at least one hole for blowing in compressed air.

14. The cable-pull actuation system for a parking brake according to claim 1, wherein the system is equipped with a manual release system comprising a release gear mechanically connected to the screw, and wherein a lid is equipped with an access hole from outside said release gear.

15. The cable-pull actuation system for a parking brake according to claim 14, wherein said access hole is closed by a removable partition.

16. The cable-pull actuation system for a parking brake according to claim 1, further comprising a parking brake comprising a drum brake fitted with a swivel bell and at least one shoe provided with a friction coating, suitable to exert a braking action on the bell when actuated, wherein the shoe is provided with an actuation member and wherein the first end of the rod is connected to said actuation member.

17. A method for releasing a parking brake comprising the steps of:
  providing a cable-pull actuation system, comprising:
    a body which houses an electric motor device,
    a rod, suitable to operate along an actuation direction, at a first end, an actuation member of a drum brake and/or a parking brake,
    a transmission device which operatively connects the electric motor device to a second end of the rod integral in translation with a screw, having a thread,
    wherein said screw is engaged, via a thread, to a nut screw actuated in rotation by said transmission device,
    where a pre-loading device is provided, acting in contrast on the screw, said pre-loading device being pre-loaded in compression by a pusher so as to exert a pre-load traction on the rod to offset variations of load on the rod,
    wherein the pre-loading device is configured to exert a thrust action on the rod following the annulment of axial clearances, in the actuation direction, between the nut screw and said body, so as to allow a compression of the incremental pre-loading device with respect to the pre-load value;
  actuating the electric motor device so as to gradually release the rod,
  monitoring the electrical current absorption of the electric motor device during said release phase,
  interrupting the release phase at the moment in which an increase in current absorption is detected when, following the annulment of the axial clearances, in the actuation direction, between the nut screw and the bushing, the pre-loading device opposes the release of the rod.

18. A cable-pull actuation system for a parking brake, comprising:
  a body which houses an electric motor device,
  a rod, suitable to operate along an actuation direction, at a first end, an actuation member of a drum brake and/or a parking brake,
  a transmission device which operatively connects the electric motor device to a second end of the rod integral in translation with a screw, having a thread,
  wherein said screw is engaged, via a thread, to a nut screw actuated in rotation by said transmission device,
  where a pre-loading device is provided, acting in contrast on the screw, said pre-loading device being pre-loaded in compression by a pusher so as to exert a pre-load traction on the rod to offset variations of load on the rod,
  wherein the pre-loading device is configured to exert a thrust action on the rod following the annulment of axial clearances, in the actuation direction, between the nut screw and said body, so as to allow a compression of the incremental pre-loading device with respect to the pre-load value,
  wherein the nut screw is coupled according to a prismatic coupling with a bushing operatively connected to the electric motor device, so as to rotate and slide axially relative thereto,
  wherein a recovery device is provided in a clearance between the bushing and the nut screw.

* * * * *